United States Patent [19]
Salamon

[11] Patent Number: 5,945,462
[45] Date of Patent: Aug. 31, 1999

[54] TEMPORARY PROTECTIVE COATINGS FOR PRECISION SURFACES

[75] Inventor: Peter A. Salamon, Hebron, Conn.

[73] Assignee: Loctite Corporation, Hartford, Conn.

[21] Appl. No.: 08/942,936

[22] Filed: Oct. 2, 1997

[51] Int. Cl.⁶ .......................... C09D 5/20; C09D 131/02; C08L 33/08; C08L 33/10
[52] U.S. Cl. ................. 522/37; 522/64; 522/71; 522/77; 522/78; 522/79; 522/80; 522/85; 522/84; 522/39; 522/40; 522/41; 522/42; 522/43; 522/44; 522/46; 522/53; 522/48; 522/60; 522/62; 524/832; 524/833; 524/804; 524/763; 524/764; 524/774; 524/773; 524/276
[58] Field of Search .................... 522/85, 84, 86, 522/37, 79, 80, 71, 77, 78, 64; 524/276, 763, 764, 774, 804, 773, 832, 833

[56] References Cited

U.S. PATENT DOCUMENTS

| | | | |
|---|---|---|---|
| 3,404,488 | 10/1968 | Cox | 51/284 |
| 4,288,479 | 9/1981 | Brack | 522/78 |
| 4,647,598 | 3/1987 | Yada et al. | 522/78 |
| 4,983,332 | 1/1991 | Hahn et al. | 264/1.1 |
| 5,061,518 | 10/1991 | Langerbeins | 427/154 |
| 5,081,174 | 1/1992 | Van Buskirk | 524/277 |
| 5,191,014 | 3/1993 | Roberts | 524/831 |
| 5,328,805 | 7/1994 | Huynh-Tran et al. | 430/284 |
| 5,380,387 | 1/1995 | Salamon | 156/154 |
| 5,548,005 | 8/1996 | Kurth et al. | 522/85 |

FOREIGN PATENT DOCUMENTS

WO 90/08165   7/1990   WIPO ............... C08F 2/16

*Primary Examiner*—Susan W. Berman
*Attorney, Agent, or Firm*—Steven C. Bauman

[57] ABSTRACT

The present invention relates to an aqueous-based coating composition for forming strippable, protective coating for protecting surfaces, such as glass, metal, ceramic, plastic or other materials of construction. More specifically, the compositions and coatings formed therefrom of this invention are particularly useful in connection with protecting precision surfaces, such as optical lenses, including but not limited to ophthalmic lenses, telescopic lenses, microscopic lenses, and the like, which protection is desirably only of a temporary nature.

30 Claims, 2 Drawing Sheets

TEMPORARY PROTECTIVE COATINGS FOR PRECISION SURFACES

BACKGROUND OF THE INVENTION

1. Field of the Invention

The present invention relates to an aqueous-based composition capable of forming a strippable, protective coating useful for protecting surfaces, such as glass, metal, ceramic, plastic or other materials of construction. More specifically, the compositions, and coatings formed therefrom, are particularly useful for protecting precision surfaces, such as optical lenses including but not limited to ophthalmic lenses, telescopic lenses, microscopic lenses, and the like, which protection is desirably only of a temporary nature.

2. Brief Description of Related Technology

In industries which handle workpieces having precision surfaces, such as the precision optical industry, an ongoing need exists for at least minimized, and desirably elimination of the, use of solvent in the manufacturing process. This need stems from the fact that such solvents are often organic-based and frequently flammable, hazardous from a health and general safety perspective, and/or present emissions and/or disposal concerns, which are subject to increasingly more stringent environmental regulation.

Two types of protective coating materials are generally employed in the precision optical industry. They are: conventional spray paint compositions and specialty coating formulations, both of which carry the concerns noted above.

The first type of protective coating, useful in connection with optical lenses and other precision surfaces, includes spray paint compositions, such as those commercially available from Sprayon Corp., under the trademark "KRYLON". Certain manufacturers of optical lenses use such spray paint compositions extensively as a protective coating for the finished first side of lenses during their manufacture. Such compositions are readily dispensed by a spray-on application and are thereafter dried quickly to provide a thin film on the finished lens surface.

One short-coming of such spray paint compositions as a protective coating (in addition to the flammability of the solvents and other combustible components employed as components thereof) is their permanence. That is, for removal purposes, surfaces which have been protected with spray paint compositions often require immersion in, or aggressive wiping with solvents, such as acetone, toluene, or trichloroethane. While the use of flammable solvents or ozone depleting chemical ("ODC") solvents in such spray-applied spray-on protective coating compositions has not been a significant drawback to small manufacturers of precision optical lenses [i.e., since the overall quantity of solvents is used in low volume operations and is correspondingly small, volatile organic compounds ("VOC") emission will necessarily be low and thus regulatory violations for discharge ODC are less likely to occur], industrial process facilities using large-scale (and thus high volume) solvent-based processes face the concerns noted above in a more pronounced and magnified manner.

The second type of protective coating employs solvent-based materials, a large degree of which are easily removable from the substrate surface after drying. Examples of such protective coatings include those based on polyvinyl acetate, mixtures of polyvinyl acetate and nitrocellulose resins, acrylic latexes and the like. See e.g., U.S. Pat. No. 3,404,488 (Cox).

The presence of organic solvents in formulated protective coating composition also presents VOC emissions issues and possible ODC compliance problems. Such compositions often also require a long drying time to accommodate the necessary solvent evaporation.

U.S. Pat. No. 5,061,518 (Langerbeins) speaks to and claims a method for providing temporary protection to the surface of a mechanical object which involves the use of an aqueous dispersion of an acrylic polymer. When the water is removed from the dispersion after application onto the mechanical object, a film of the polymer is formed which itself is reported to be removable when contacted with a combustible organic solvent.

U.S. Pat. No. 5,081,174 (Van Buskirk) speaks to and claims a water-based coating composition for forming a temporary, protective coating on metallic substrates which is removable with an alkaline aqueous cleaning solution. The '174 patent indicates that cross-linking of materials in the composition can impair the removability of a temporary protective coating. (Col. 4, lines 24–25.) Accordingly, the '174 patent is seen to avoid cross-linking reactions for the polymer of the composition.

U.S. Pat. No. 5,191,014 (Roberts) speaks to and claims an aqueous coating composition for use as a temporary coating which requires the presence of methacrylamide. The '014 patent specification indicates that "methacrylamide is necessary in order to obtain removal of the temporary protective coating by dilute alkali within a period of one minute and preferably the portion of the methacrylamide should be at least 5 weight percent in order to permit rapid removal of aged coatings." (Col. 11, lines 11–15.) The '014 patent specification also indicates that the coating compositions are "tolerant of neutralization by cations especially aqueous, ammonia or sodium." (Col. 6, lines 1–8.) The '014 patent further indicates that the dilute alkali is "alkaline water pH 12–12.5 containing surfactant and thickener . . . " (Col. 6, lines 41–43.)

International Patent Publication Number WO 90/08165 speaks to compositions for protective coatings which includes a mixture of nonvolatile and evaporant materials, such as defoamers, wetting aides, dispersing aides, plasticizers and coalescents, release aides, resins, thickeners and water. The '165 publication does not speak to a photoinitiated cure of such composition, and also does not speak to the cross-linking of its components to provide a cross-linked or polymerized reaction product.

Zeneca Resins makes available commercially under the tradename "NEORAD" NR-3709 a water-borne UV/EB curable aliphatic urethane dispersion which includes an acrylic monomer trimethylol propane triacrylate. In Zeneca product literature, the "NEORAD" NR-3709 dispersion is indicated to be UV curable, and in fact suggests the use of the commercially available photoinitiator "DAROCUR" 1173. However, the "NEORAD" resin is designed for the purpose of forming a permanent coating rather than a removable coating. Indeed, "NEORAD" NR-3709 is said in such product literature to have "excellent adhesion" and "solvent resistance". In fact, that product literature suggests a use for "NEORAD" NR-3709 as the basis for a UV curable wood lacquer which "has excellent resistance to water, solvents and plasticizers . . . ".

U.S. Pat. No. 5,380,387 (Salamon), the disclosure of which is hereby expressly incorporated herein by reference, describes radiation-curable lens blocking/deblocking adhesive compositions. The compositions of the '387 patent include a predominant amount of at least one radiation-curable acrylic-capped organic prepolymer resin, a lesser amount of a monofunctional ethylenically unsaturated diluent monomer, a minor amount of at least one non-reactive release agent, and a suitable photoinitiator. These compositions adhere the lens or lens blank to a support member or block, for subsequent machining, polishing and/or other necessary treatments.

Notwithstanding the teaching of the '387 patent, it would be desirable to have an environmentally-safe (e.g., aqueous-based, removable, protective film, particularly well-suited for use in the manufacture and subsequent handling and use of precision surfaces or other articles which are susceptible to degradation, contamination, or other actual or potential adverse effects in an unprotected state. It would also be desirable to have a composition that is useful for the temporary protection of the finished first side of an optical lens during the subsequent processing, e.g., grinding, polishing, and centering, of a second side.

SUMMARY OF THE INVENTION

The present invention meets the need articulated above by providing an aqueous-based composition which cures to form a reaction product which is suitable for use as a strippable protective coating for protection of surfaces, e.g., precision optical surfaces.

More specifically, the present invention provides aqueous-based coating compositions useful for forming temporary protective coatings, such as for use on a precision surface. The compositions include at least the following components:

(a) a (meth)acrylate-capped organic prepolymer resin having at least one pendent hydrophilic group in an amount in the range of about 5% up to less than 98% by weight of the total composition, such as about 5% up to less than 45%, (b) a reactive diluent having at least one (meth)acrylate group in an amount in the range of about 0.5% up to less than 10% by weight of the total composition, such as about 0.5% up to less than 5%, (c) a non-reactive, hydrophilic release agent, (d) a photoinitiator, and (e) water in an amount within the range of from about 40% to about 95% by weight, based on the total weight of the composition.

The aqueous-based coating composition of this invention may be suitably employed as a one-part, ready-to-use formulation.

The composition may be applied to a desired surface and thereafter dried to form a protective coating and, optionally, exposed to electromagnetic radiation at an intensity, and for a time, sufficient to form a reaction product from the components of the composition in the form of a cured film. Whether formed into a dried film or a cured film, the so-formed film may be readily removed from the surface on which it was formed.

In another aspect of the invention, there is provided a protectively-coated article having a dried film prepared from a protective coating formulation according to this invention formed on a surface thereof. The dried film of the protective coating formulation layered on the protectively-coated article may also be exposed to radiation in the electromagnetic spectrum which is curingly effective to cure the film, so as to cross-link the dried coating formulation thereby enhancing the physical properties of the material thereof.

The present invention also provides a method of protecting a surface of an article during handling, storage and/or processing thereof. The method includes the steps of applying to the surface of the article an aqueous-based coating composition according to this invention; and drying the applied aqueous-based coating composition to form a dry, tack-free protective coating on such surface. In an optional, but desirable, radiation exposure step, the dry, tack-free film may be exposed to radiation in the electromagnetic spectrum at an intensity, and for a time, sufficient to form a reaction product from the components of the composition—i.e., photopolymerize the acrylic functionality of the organic prepolymer and the functional groups, such as polyacrylic groups, on the reactive diluent—in the form of a cured film.

The invention also provides a dispensing assembly which involves a vessel capable of containing a quantity of the aqueous coating formulation of the invention, and pump, nozzle, or other spray-forming means, for dispensing the aqueous coating formulation in a finely dispersed spray from the vessel.

Additional aspects and features of the invention will be more readily apparent from the ensuing disclosure and appended claims.

DETAILED DESCRIPTION OF THE INVENTION

Figure 1:
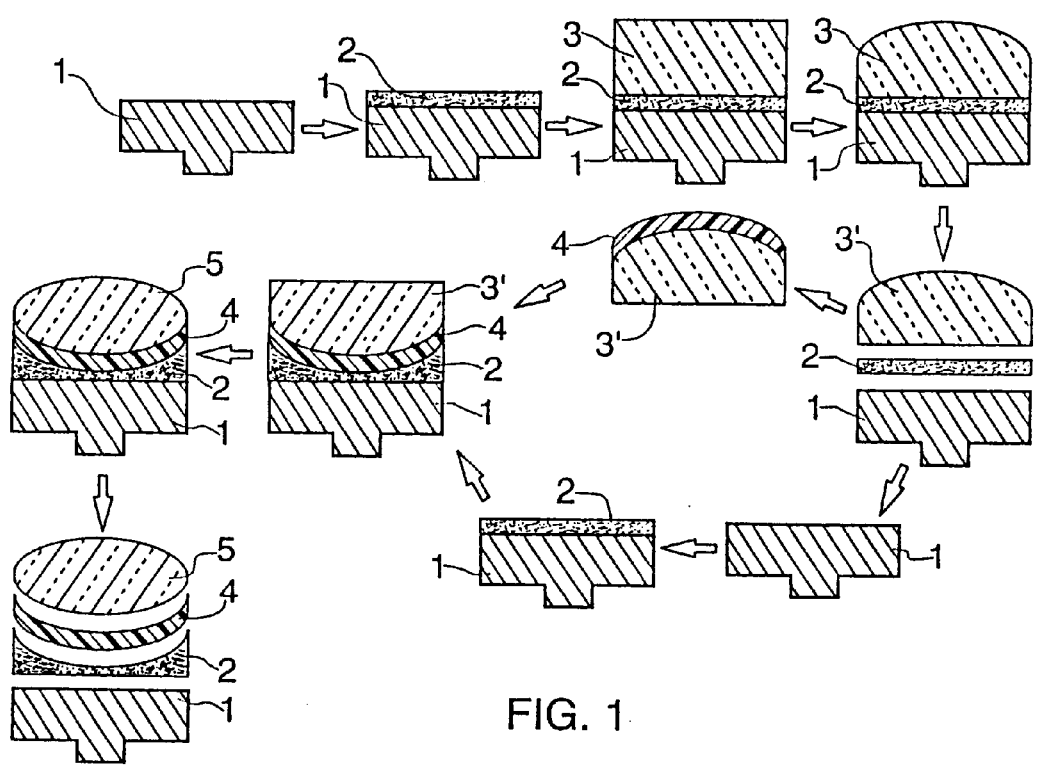
FIG. 1 depicts cross-sectional views of a lens blank at its certain processing points during into a finished lens product.

The compositions of the present invention provide a highly effective coating for the surface of articles, such as precision optics and other surfaces requiring protection, in connection with their handling, storage, processing, and the like.

To that end, the present invention provides aqueous-based coating compositions including a (meth)acrylate-capped organic prepolymer resin having at least one pendent hydrophilic group. This prepolymer resin should be used in an amount in the range of about 5% up to less than 98% by weight of the total composition, such as about 0.5% up to less than 45%.

The compositions further include a reactive diluent having at least one polymerizable (meth)acrylate group. This reactive diluent should be used in an amount in the range of about 0.5% up to less than 10% by weight of the total composition, such as about 0.5% up to less than 5%.

The compositions still further include a non-reactive hydrophilic release agent, a photoinitiator, and of course water. The water content of the compositions should be in an amount within the range of from about 40% to about 95% by weight, based on the total weight of the aqueous-based coating compositions, with a water content within the range of from about 42 to about 50%, such as about 44% to about 48%, being desirable.

The compositions may be readily applied to a lens blank or other substrate to be protectively coated in any suitable manner with any appropriate application means. For instance, the formulation may be dispersed in a form having a sufficiently low viscosity so as to render it sprayable onto the substrate to be protectively coated. Dispensing of the compositions in this manner should insure a more uniformly applied coating film.

Desirably, the compositions of this invention have a relatively low solids content, such as an amount within the range of from about 5 to about 40%, particularly about 21% solids content. A solids content at about this level allows the composition to be applied readily as a thin film coating, desirably of a thickness on the order of about 2 mils or less, particularly when used in connection with precision optics, and with a drying time of less than about thirty minutes at ambient conditions (e.g., at a temperature of about 25° C. and a relative humidity of about 30%).

The aqueous-based coating compositions of this invention may be dried to form a tack-free protective coating, which may also be cured by exposure to radiation in the electromagnetic spectrum (e.g., ultraviolet and/or visible radiation). This curing step assists in developing the desired mechanical properties of the film, with the choice of radiation cure being dependent at least in part on the substrate to be protectively-coated and the manner in which it is to be processed, and the particular components of the composition itself.

The (meth)acrylate-capped organic prepolymer resin component employed in the aqueous-based coating composition of the present invention includes resins which have terminal (meth)acrylate groups and which have at least one pendent hydrophilic group. The term "(meth)acrylate" as used herein is intended to refer to both acrylate and methacrylate functionalities.

The pendant hydrophilic group on the organic prepolymer resin may be any group which tends to render the prepolymer more amenable to attraction to, or dispersion or dissolution in aqueous media. Examples of such hydrophilic groups include organic acids, such as carboxylic acids (and salts thereof or which may form salts) or phenolic compounds, and organic bases, such as amines (and salts thereof or which may form salts).

These prepolymers may be viewed as one-component, polymerizable block copolymers having hydrophilic, rigid and flexible segments. The prepolymers may be prepared by the chemical linking of three different types of prepolymer segments which are subsequently capped with (meth) acrylate functionality.

The term "hydrophilic" segment is meant to include a segment(s) containing at least one pendant hydrophilic group, such as an organic acid or an organic base.

The term "rigid" segment is meant to include a segment(s) containing aromatic, heterocyclic or cycloaliphatic rings. If multiple segments are involved, they should be joined by fusing such rings or by a minimum number of carbon atoms (e.g, 1–2 if linear, 1-about 6 if branched) such that there is little or no flexing of the segments.

The term "flexible" segment is meant to include a segment(s) containing primarily linear aliphatic moieties having internal unsaturation. Pendant functional groups, including aromatic, heterocyclic and cycloaliphatic groups, with or without branching, may also be included, provided that there is no substantial interference with the flexible nature of the linear hydrophilic segment portion.

For instance, a hydrophilic polyol carboxylic acid segment, such as dimethanol propanoic acid, may be reacted with a molar excess of a rigid diisocyanate segment, such as isophorone diisocyanate, thereby forming urethane linkages. Then the resulting hydrophilic diurethane diisocyanate material may be reacted with a molar excess of a flexible polymeric polyol segment, such as poly(propylene glycol), to form an organic prepolymer within the structure $[AB]_c$ $(A')_d$, as described below. Of course, before reacting with the polymeric polyol segment, the diisocyanate may be reacted in excess with another rigid segment containing at least two active hydrogen atoms, such as those found on hydroxyl or amine groups, thereby extending the other rigid segment with isocyanate groups.

Thereafter, the so-formed organic prepolymer may be capped with a wide variety of hydroxyl functionalized (meth)acrylate materials ("M" and "M'") to form $M-[AB]_c$ $(A')_d-M'$, where M and M' may be the same or different. Examples include hydroxyalkyl(meth)acrylates, hydroxyalkenyl(meth)acrylates and hydroxyaryl(meth) acrylates, such as hydroxyethyl(meth)acrylate.

Polyisocyanates which may be used to build the organic prepolymer to be capped with (meth)acrylate include those within the structure below:

$$A-(NCO)_a$$

where A is a alkyl or alkenyl group linear, branched or cyclic having from about 6 to about 20 carbon atoms, or an aryl group having from 6 to about 20 carbon atoms, and a is an integer between 1 and 5, such as 2.

Illustrative of the polyisocyanates employed in the preparation of these organic prepolymers include, among others, phenyl diisocyantate, toluene diisocyanates (such as tolylene-2,4-diisocyanate, "TDI"), 4,4'-diphenyl diisocyanate, 4,4'-diphenylene methane diisocyanate ("MDI"), dianisidine diisocyanate, 1,5-naphthalene diisocyanate, 4,4'-diphenyl ether diisocyanate, p-phenylene diisocyanate, 4,4'-dicyclo-hexylmethane diisocyanate, isophorone diisocyanate, 1,4 hexamethylene diisocyante, 1,4-phenylene diisocyanate, 1,4-phenylene diisocyanate, 1,4-cyclohexene diisocyanate, 1,3-bis-(isocyanatomethyl) cyclohexane, cyclohexylene diisocyanate, tetrachlorophenylene diisocyanate, 2,6-diethyl-p-phenylenediisocyantate and 3,5-diethyl-4,4'-diisocyanatodiphenyl-methane. Still other polyisocyanates include the higher molecular weight rigid polyisocyanates obtained by reacting polyamines containing terminal, primary and secondary amine groups or polyhydric alcohols, for example, alkane, cycloalkane, alkene and cycloalkene polyols, such as glycerol, ethylene glycol, bisphenol-A, and the like, with an excess of any of the above-described isocyanates. These higher molecular weight urethane or ureide polyisocyanates may be represented by the formula:

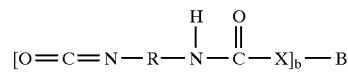

where R is an organic radical selected from alkyl, alkenyl, cycoaklyl, cycloalkenyl of 2 to about 20 carbon atoms, and aryl, aralkyl and alkaryl groups of 6 to about 20 carbon atoms, with or without substitution; X is —O— or

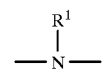

where $R^1$ is hydrogen or lower alkyl of 1 to about 7 carbon atoms; B is a polyvalent organic radical selected from cycloalkyl, cycloalkenyl, aryl, aralkyl, alkaryl and heterocyclic groups, with or without substitution; and b is an integer from 2 to about 6.

As indicated above, the diisocyanate may desirably be reacted with another rigid segment, such as one having an aromatic, heterocyclic or cycloaliphatic portion containing at least two active hydrogen atoms, such as diamines and diols.

This reaction may be carried out at temperatures within the range of from room temperature to about 180° C., desirably within the range of from about 40° C. to about 120° C.

Suitable compounds for this other rigid segment to which reference is made above include 2,2-(4,4'-dihydroxydiphenyl)-propane (i.e., bisphenol-A), 4,4'-isopropylidenedicyclohexanol (i.e., hydrogenated bisphenol-A), ethoxylated bisphenol-A, propoxylated bisphenol-A, 2,2-(4,4'-dihydroxydiphenyl)-butane, 3,3-(4,4'-dihydroxydiphenyl)-pentane, α, α-(4,4'-dihydroxydiphenyl)-p-diisopropylbenzene, 1,3-cyclohexane diol, 1,4-cyclohexane diol, 1,4-cyclohexanedimethanol, bicyclic and tricyclic diols such as 4,8-bis-(hydroxymethyl)-tricyclo [5.2.1.0$^{2,6}$] decane, 2,2,4,4-tetramethyl-1,3-cyclobutanediol, hydroquinone, resorcinol and 2,2-(4,4'-dihydroxydiphenyl)-sulfone, among others, as well as halogenated derivatives of the above, such as tetrabrominated ethoxylated bisphenol-A.

The ring component of these compounds may also be substituted with either reactive groups or unreactive groups, such as alkyl groups containing about 1 to 4 carbon atoms.

As noted above, once formed, the organic prepolymer is one within the structure below:

$$[AB]_c(A')_d,$$

where A and A' may be the same or different and may be chosen from polyalkylene moieties having at least one hydroxyl group (e.g.,

$$[HO— \{\phantom{x}\}_n —O]_m —H,$$

where n is 1 to about 6, so that the polyalkylene may be linear, branched or cyclic, and m is 1 to about 40), or amino group (e.g., $$[H_2N— \{\phantom{x}\}_n —O]_m — \{\phantom{x}\}_o NH_2,$$

where n is 1 to about 6, with the polyalkylene being linear, branched or cyclic, and m is 1 to about 40, and o is 1 to about 40, such as an hydroxyl-terminated polymethlylene oxide, an amino-terminated polymethylene oxide, or an hydroxyl-terminated, amino-terminated polymethylene oxide; and B is represented by C(W)(X)(Y)(Z), where X is an organic acid, such as an alkyl, alkenyl (linear, branched or cyclic) or aryl carboxylic acid having from 2 to about 10 carbon atoms, or an organic base, such as an alkyl, alkenyl (linear, branched or cyclic) or aryl amine having from 1 to about 10 carbon atoms; w is hydrogen or within X, but not necessarily the same as X; Y and Z may be the same or different and may be selected from hydroxyl- or amino-functionalized alkyl, alkenyl (linear, branched or cylic) or aryl groups having from 2 to about 10 carbon atoms; and c is an integer between 1 and 5 inclusive and d is an integer between 1 and 10.

To cap the so-formed organic prepolymer, a molar excess of a diisocyante as described above may be reacted with the prepolymer and thereafter that product reacted with at least two moles of an hydroxy-functional (meth)acrylic material, such as those described above. The so-formed product is a (meth)acrylic-capped organic prepolymer resin having at least one hydrophilic group within the structure M-[AB](A')-M'.

Such organic prepolymer resins are desirably attracted to, or dispersible or dissolvable in water so as to form a latex solution. Ordinarily, in the context of the present invention, such resins may be employed in an amount within the range of about 5% up to less than 98% by weight of the total composition, such as about 5% up to less than 45%.

A desirable resin within that structure may be represented by the structure shown below:

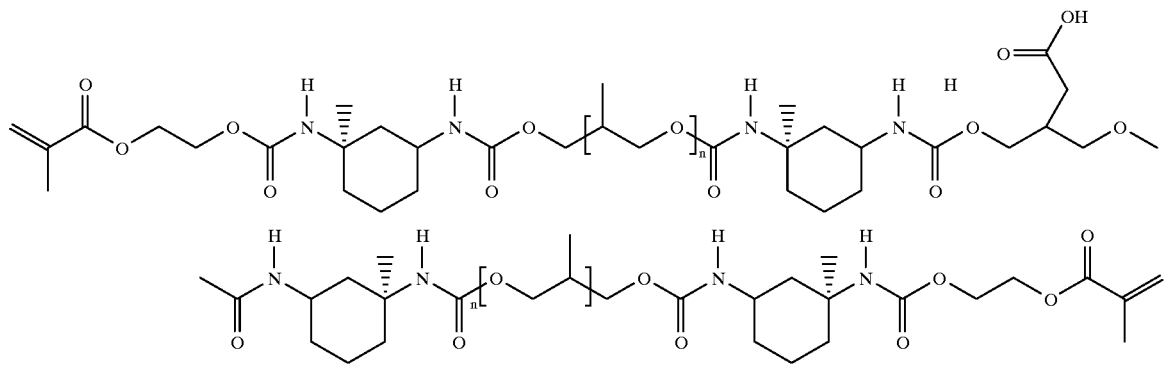

where n is from 1 to about 6. This (meth)acrylate-capped organic prepolymer resin is a component in a latex solution commercially available under the tradename "NEORAD" NR-3709, from Zeneca Resins, Wilmington, Mass. "NEORAD" NR-3709, as described in Zeneca product literature, is a radiation-curable polyurethane aqueous dispersion, reported as having a pH of 7.3–8.3, a solids content of 36–38%, a weight average molecular weight of 26,500 and a boiling point in the range of 192–212° F. The "NEORAD" NR-3709 also includes trimethylol propane triacrylate.

Other commercially available Zeneca resins which may be used individually or in combination with "NEORAD" NR-3709 in the context of the present invention include "NEORAD" NR-440 and NR-3800, whose physical properties include a pH of about 8, a solids content of between 40 and 45%, and a weight average molecular weight of about 7,500.

The compositions of this invention may also include a reactive diluent, which may be polyacrylate based and possess the capability of copolymerizing with the organic prepolymer resin during the curing of the composition.

The polyacrylate-based reactive diluent may be chosen from any suitable polymerizable or further polymerizable material having poly(meth)acrylic functionality, such as, for example, 1,3-butylene glycol diacrylate, diethylene glycol diacrylate, 1,6-hexandiol diacrylate, neopentyl glycol diacrylate, triethylene glycol diacrylate, tetraethylene glycol diacrylate, trimethylol propane ethoxylate triacrylate, pentaerythritol tetraacrylate, tripropylene glycol diacrylate, trimethylol propane triacrylate, ditrimethylol propane tetraacrylate, dipentaerythritol pentaacrylate, pentaerythritol triacrylate and their corresponding (meth)acrylate compounds, and combinations thereof. Tri- and higher polyacrylates, including, for example, trimethylolpropane triacrylate and dipentaerythritol pentacrylate, are particularly desirable in this regard.

In the compositions of the present invention, the ratio of (meth)acrylate-capped organic prepolymer resin to reactive diluent is desirably within the range of from about 120 to about 1.5, with about 60 to about 3, such as about 27 to about 6.7 being particularly desirable. Accordingly, the capped organic prepolymer concentration in the compositions of the present invention may be in the range of from about 20 to about 25 percent by weight, based on the total weight of the formulation, and with the ratio of capped organic prepolymer to reactive diluent as indicated above.

As the release agent, a variety of well-known commercially available materials may be employed. For instance, lecithin, polyethylene glycols, such as polyethylene glycol (400), and fatty acids, such as stearic acid, and palmitic acid, may be used.

Those release agents having appreciable water-solubility, water-dispersibility and/or water-dissolution capability are particularly desirable. That is, desirable release agents may be surface active agents, such as those derived from soy bean oil extract. For instance, fatty acid esters (such as ethylene glycol monostearate), fatty acid amides (such as ethylene bisstearamide), fatty acid esters (such as castor oil), fatty acid salts or metallic soaps (such as sodium or calcium stearate), other fatty acid derivatives (such as vinyl stearate), paraffin waxes, boeson, glycerol and derivatives thereof, may be used. For a more detailed discussion of such release agents, see *Chemical Additives for the Plastics Industry*, the disclosure of which is hereby expressly incorporated herein by reference.

The release agent may be used in an amount of from about 0.1 to about 1% by weight of the total composition, with about 0.5% being desirable. A particularly desirable release agent is lecithin, which may be obtained commercially from Archer Midlands Daniels Co., Decatur, Illinois under the trademark "YELKIN", such as "YELKIN" TS, SS, DS and T.

The photoinitiator employed to effect photopolymerization cross-linking of the organic prepolymer resin and reactive diluent may be of any suitable type, and such photoinitiator may be employed alone or in combination with a photosensitizer.

Suitable photoinitiators include those known for use generally with radiation or light curable acrylate systems, and which exhibit a degree of water solubility or water dispersability which is seen as desirable within the context of the present invention. Examples of such photoinitiators are acetophenone and derivatives thereof, such as dichloroacetophenone, trichloroacetophenone, dialkoxyacetophenone, 2,2-dimethoxy-2-phenylacetophenone and 4-dialkylaminoacetophenone; benzophenone and derivatives thereof, such as 4,4'-bis (dimethylamino)benzophenone; benzil; benzoin and derivatives thereof, such as benzoin alkyl ether; benzildimethylketal; benzoylbenzoate; alphaacyloxime esters; thioxanthone and derivatives thereof, such as 2-chlorothioxanthone and diethylthioxanthone; azo- compounds, such as azobisisobutyronitrile; benzoyl peroxide; camphoquinone; phosphine oxides, such as diphenyl-2,4,6-trimethylbenzoylphosphine oxide and the like. Of course, appropriate combinations thereof may also be employed.

From among the photoinitiators recited above, particularly desirable photoinitiators include 1-benzoyl-cyclohexanol and diphenyl-2,4,6-trimethylbenzoylphosphine oxide. Particularly desirable ones include those available commercially from Ciba-Geigy Corporation, Hawthorne, N.Y., under the tradenames "DAROCURE" or "IRGACURE", such as "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4-,4-trimethyl pentyl phosphine oxide and 2-hydroxy-2-methyl-1-phenyl-propan-1-one) and "DAROCURE" 1173 (2-hydroxy-2-methyl-1-phenyl-1-propane) and 4265 (the combination of 2,4,6-trimethylbenzoyldiphenyl-phosphine oxide and 2-hydroxy 2-methyl-1-phenyl-propan-1-one); and the visible light [blue] photoinitiators, dl-camphorquinone and "IRGACURE" 784DC. Of course, combinations of these materials may also be employed herein. Other suitable photoinitiators will be readily recognized by those skilled in the art.

The photoinitiator should be used in an amount within the range of from about 0.01 to about 0.5% by weight of the total composition, such as about 0.4% by weight.

Suitable photosensitizers which may be used in combination with the photoinitiator include amine derivatives, such as N-butylamine, di-N-butylamine, trimethylamine and triethylamine; tri-N-butylphosphene; allylthiourea and diethylaminoethyl (meth)acrylate; and combinations thereof.

In addition, the composition may include a basic component to adjust the pH of the composition, and to promote stability of the composition. Ammonia is one appropriate basic component in this regard, with concentrations of from about 0.01 to about 0.05 percent by weight of the total composition being appropriate. Other basic components suitable for use include lithium, sodium or potassium hydroxide, ammonium hydroxide and triethylamine. A desirable pH range for the compositions of the present invention is one which is near neutral pH, such as greater than about 6.7 but less than about 8.

In addition, compositions of the present invention may further include stabilizers (e.g., quinones and hydroquinones) which act as radical scavengers, fillers, nonreactive diluents, coloring agents or dyes (e.g., FD&C Blue #1), plasticizers, thickeners, antioxidants, leveling agents (e.g., polyether-modified-polydimethyl siloxane, such as is available commercially from BYK Chemie, Wallingford, Conn. under the tradename BYK-346), antifoaming agents (such as those available commercially from BYK Chemie, Wallingford, Conn. under the tradename BYK-022 and 024), dispensing agents and the like. Generally, these constituents, their functions and the amounts to be used are well-recognized and known to those persons of skill in the art.

Desirable plasticizers for use herein include phthalates generally, and more specifically, bisphthalates, isophthalates, hexahydrophthalates and combinations thereof, trimellitates generally, and more specifically trimellitates and pyromellitates, epoxy-type plasticizers, polyesters and other polymeric plasticizers, phosphates, phosphites, linear plasticizers such as glutarates, adipates citrates, azelates, sebacates, succinates, glycerol and derivatives thereof, and the like, and combinations thereof. Particularly desirable plasticizers for use herein include phthalates, such as dibutyl phthalate, and glycerols, such as glycerol.

The amount of plasticizers should be in the range of from about 0.1 to about 5% by weight, with about 1.35% by weight being particularly desirable.

If used, the amount of thickener should be up to about 4% by weight, such as about 0.84% by weight; the amount of leveling agent should be in the range of from about 0.01 to about 0.5% by weight, such as about 0.125% by weight; the amount of anti-foaming agent should be up to about 0.5% by weight, such as about 0.4% by weight; and the amount of dye should be in the range of about 0.05% to about 0.5% by weight, such as about 0.15% by weight. An appropriate thickener is one available commercially from Henkel Corporation, Gulph Mills, Pa. under the tradename DSX-1550.

The aqueous-based coating compositions of the present invention may be formed into films, such as dry films which have not been exposed to conditions sufficient to polymerize the reactive components of the composition, and also into cured films which have been exposed to radiation in the electromagnetic spectrum, such as visible and/or ultraviolet radiation, sufficient to cure the components of the composition. Irrespective of whether the compositions are cured, partially-cured or not cured at all, films formed therefrom may be removed readily from the surface on which the compositions have been applied and formed into films.

If dry films are formed with a thickness of about 2 mils or less, by appropriate selection of wet film thickness of the applied aqueous-based coating composition, a correspondingly short drying time, typically less than about 60 minutes, may be obtained.

Desirably, after the water component of the composition has evaporated from the applied wet film, the so-formed dried film may be exposed to radiation in the electromagnetic spectrum (e.g., visible and/or ultraviolet radiation) so as to polymerize the reactive components of the composition. This photopolymerization process increases the film strength and resistance to water-based grinding fluids, without adversely affecting the removability of the reaction product so formed.

The aqueous-based coating compositions of the present invention may be applied to a surface of a substrate in any suitable manner, as for example by spraying, brushing, dipping, roller coating, sponging, wet web application, or in any other suitable manner. Generally, however, spraying of the aqueous-based coating composition is desired so as to achieve a desired uniform thickness of the composition on the substrate surface.

The surface of the substrate to be coated should be clean, dry and free of grease, oil, or other materials capable of contaminating the surface of the substrate so as to interfere with the adhesiveness of the composition as well as its ability to form a dry film or a cured film. The aqueous-based coating composition may be applied to such a surface at any suitable wet film thickness, with the wet film thickness being generally dependent on the solids level of the aqueous coating composition and the subsequently desired dry film thickness. The amount of water in the aqueous-based coating composition may be varied in the practice of the present invention, though typically it should be within the range of from about 40% to about 95% by weight, based on the total composition. The appropriate wet and dry film thicknesses for a specific end use application may be readily determined by film thickness measurements, using well-known and established techniques to determine the satisfactory film thickness for a given end use application.

After the aqueous-based coating composition of the present invention has been applied to the surface of the substrate article to be protected, the composition may be dried in open air at ambient temperature conditions. Generally, drying at temperatures above about 45° C. is undesirable since above such temperature the film surface may be characterized as unacceptable. Such air drying should be carried out for sufficient time to form a dried-to-the-touch surface film. Typically, the drying time is within the range of about 30 to about 60 minutes at a temperature of about 25° C., about 20 to about 40 minutes at a temperature of about 30° C., and about 10 to about 30 minutes at a temperature of about 35° C., for representative compositions within the scope of the present invention.

The resulting film possesses a dried, tack-free surface and is readily strippable or removable from the substrate on which it is formed. The coating may be used in such air-dried state, or if desired the coating may be exposed to radiation in the electromagnetic spectrum sufficient to photopolymerize and cross-link the composition so as to further enhance the structural integrity and mechanical properties of the film. Radiation cure of the film may also improve the ease of removal of the film from the substrate surface.

As noted above, radiation curing of the dry film may include any suitable curingly effective radiation exposure, e.g., of visible and/or ultraviolet radiation, the choice of radiation being readily determinable by routine experimentation without undue effort. For example, curing may be carried out at a radiation flux on the order of 30 milliwatts per square centimeter of film surface, at a radiation wavelength in the range of about 365 to 400 nm, for a sufficient period of time, e.g., about 90 seconds, to effect cure. A suitable light source for such radiation curing exposure is a mercury arc lamp which may be equipped in a "ZETA" 7400 UV curing chamber, commercially available from Loctite Corporation, Hartford, Conn.

The aqueous-based coating compositions of the present invention may also be prepared into dried and/or cured films independent of a substrate on which it is to be applied and stored for subsequent use.

Many known film manufacturing processes may be employed to manufacture into cured films aqueous-based protective coating compositions in accordance with the present invention, including calendaring, casting, rolling, dispensing, coating, extrusion and thermoforming. For a non-exhaustive description of such processes, see Modern *Plastics Encyclopedia* 1988, 203–300, of McGraw-Hill Inc., New York (1988). The photocurable composition, dispensing or coating with respect to conventional techniques, such as curtain coating, spray coating, dip coating, spin coating, roller coating, brush coating or transfer coating may be used.

A film of the aqueous-based protective coating composition may be prepared by extrusion or calendaring where photopolymerization occurs by exposure to electromagnetic radiation prior to, contemporaneously with, or, if the composition is sufficiently viscous, after passing through the extruder or calendar. Thereafter, the film may be placed between the desired substrates, and construction of a device may be completed.

The viscosity of the compositions may be controlled or modified to optimize its dispensability by, in addition to inclusion of an appropriate material to alter the viscosity thereof, adjusting the temperature of (1) the composition itself, or (2) the substrates on which the composition may be placed to assemble the device. For example, the temperature of the composition or the substrate(s) or combinations thereof may be decreased to increase the viscosity of the composition. In this way, the uniformity on the substrate of the dispensed composition may be enhanced using lamination techniques, centrifuge techniques, pressure applied from the atmosphere (such as with vacuum bagging), pressure applied from a weighted object, rollers and the like.

The substrates onto which the compositions of the present invention are intended to be dispensed may be constructed from those materials presented supra, which may be flexible as well as substantially inflexible. The type of substrate chosen with respect to flexibility will of course depend on the application for which they are to be used. More specifically, the substrates may be constructed from substantially inflexible substrates, such as glass, laminated glass, tempered glass, optical plastics, such as polycarbonate, acrylic and polystyrene, and offer alternatives as noted supra; and flexible substrates, such as "MYLAR" film or polyolefin, such as polyethylene or polypropylene, tubing.

The choice of substrate may influence the choice of processing technique used to prepare the composition into the cured reaction product or the type of device assembled.

In addition, roll-to-roll systems may be employed where flexible substrates are released from rolls (that are aligned and rotate in directions opposite to one another), and brought toward one another in a spaced-apart relationship. In this way, the composition may be dispensed or injected onto one of the flexible substrates at a point where the two flexible substrates are released from their respective rolls and brought toward one another, while the compositions are being contemporaneously dried and exposed to electromagnetic radiation for a time sufficient to cure the composition into a film to be used as a protective coating.

The dispensing of the composition may be effected through an injection nozzle positioned over one of the rolls of flexible substrate. By passing in the path of the nozzle as a continuously moving ribbon, a flexible substrate may be contacted with the composition in an appropriate amount and positioned on the flexible substrate.

The air-dried film of the aqueous-based coating composition of the present invention, as well as the radiation cured films formed by photopolymerization radiation exposure thereof, may be removed from the substrate surface by differential delamination, e.g., the manual peel-off of the film using a pressure-sensitive tape attached to the top film surface (see e.g., ASTM D-3359 Method A), or other suitable differential de-adhesion processes by which a lift-off force is applied to the film at its top surface, forcing delamination of the film from the surface of the substrate article.

In the context of the present invention, "differential de-adhesion" refers generally to the pulling or peeling off of the surface of the article by application of a de-adhesion force or delamination to the surface of the protective film, as for example by attachment of a peel-off tape to the surface of such film, or by depositing an adhesive or other mass or structure on the surface of the protective film, which then provides a medium through which a de-adhesion force is applied at the interface between the surface of the article and the surface of the protective film in contact with such article surface.

"Solvent de-adhesion" refers generally to removal or delamination of the protective film by exposure, soaking or other contacting method, with solvents such as aqueous medium containing soap and/or surfactant, such as, sodium lauryl sulfate in water, or organic solvents, such as isopropanol or acetone, at ambient temperature conditions or greater up to about 83° C., which is ordinarily used for precision glass substrates.

Desirably, the cured film should remain intact if removed by such solvent de-adhesion methods, rendering the solvent reusable (with or without a purification step) as the protective film de-adheres unitarily from the substrate surface and may be easily separated from the solvent liquid. Coating equipment used for application of the aqueous-based coating composition may be readily cleaned by flushing with water, and the rinse water may thereafter be disposed of in accordance with local regulations without requiring treatment, thereby achieving a substantial advance over the use of known organic solvent-based coatings, with their attendant concerns of flammability and regulatory constraints on disposal and use.

One particularly desirable use for the dried films and cured films formed from the aqueaous-based coating compositions of the present invention is in connection with adhesives and blocking pitches used in the manufacture of precision lenses and other optical glass products. Indeed, interferometry testing, before and after application of the aqueous-based coating compositions of the present invention to the surfaces of precision optical lenses, shows no measurable distortion from the glass lenses. Thus, the aqueous-based coating compositions of the present invention are observed to not distort the lenses after application or after cure thereof. In addition, compositions of the present invention are observed to not stain or discolor most of the substrates on which they are applied and thereafter formed into films. In this respect, the aqueous-based coating composition may be formulated to contain a dye or other visually-detectable component, for visual verification of the coating as originally applied, as well as to visually verify the removal of the film in the subsequent stripping step.

The aqueous-based coating compositions of the present invention may be readily formulated as one-part compositions. And due to the water content, such compositions obviate the above-mentioned problems of known solvent-based coating compositions. The compositions of the present invention may be readily air-dried, and then polymerized after exposure to appropriate radiation, such as visible and/or ultraviolet radiation. The compositions of this invention also exhibit little or no odor and are impervious during standard processing operations to which precision lens products are typically subjected. The films formed from the compositions of the present invention (whether air dried or cured) do not stain most lens types or distort any lens types which they are applied, and such films are readily strippable from the substrate.

By appropriate formulation, the aqueous-based coating compositions of the present invention may be utilized in a pump spray formulation or in an aerosol formulation.

Referring now to the drawings, FIG. 1 shows constituent steps carried out in a method for preparing a lens from a raw lens blank, utilizing the protective coating of the present invention to protect a finished first side of a lens during processing of the second side thereof.

In short, the method of this invention includes the steps of applying to the surface of the article the aqueous-based coating composition in accordance with this invention; drying that composition so as to provide a dry, protective coating on such surface in the form of a film; and exposing the dry, film on such surface to radiation in the electromagnetic spectrum curingly effective to effect photopolymerization of the composition.

In the method shown in the scheme of FIG. 1, the lens blank 3 is bonded to the lens block or support member 1. The adhesive 2 (which may be an adhesive composition of the type described in the '387 patent, the disclosure of which is hereby expressly incorporated herein by reference) is applied to the bonding surface of the lens block 1. After application of adhesive 2 to the bonding surface of the lens block 1, the lens blank 3 is seated on the adhesive-coated bonding surface, with the seating of the lens blank 3 on the lens block 1 being optionally aided by use of an appropriate alignment sleeve (not shown).

Subsequently, the assembled lens and support structure is exposed to electromagnetic radiation (e.g., ultraviolet radiation) for a period of time of about 30 seconds or more to fixture the lens blank 3 to the lens block 1. Lens blank alignment then is verified and the assembly is exposed to radiation for an additional period of time of about 60 seconds or more to fully cure the adhesive.

Thereafter, the cured assembly may be subjected to working where the lens blank 3, for instance, is ground, polished or subjected to other treatment steps. Following working of the exposed surface of the lens blank 3, the assembly is placed in an appropriate debonding solution, for example water and surfactant, acetone or the like, for a sufficient period of time to debond the lens piece from the lens block.

Onto the worked surface of the lens is dispensed an appropriate amount of aqueous coating composition in accordance with the present invention, which is formed into a film or protective coating 4 as described above by air drying, and optionally exposure to radiation in the electromagnetic spectrum.

Next, the lens at its worked surface (the surface on which is coated the protective coating 4) is bonded to the support member 1, and subjected to further processing on the second side of the lens member, to yield the finished lens, from which the protective coating 4 may be stripped, as described above.

Optionally, or additionally, the finished lens may be protectively coated with a film of the aqueous coating composition of the present invention over its entire surface (formed as described above), for protection during subsequent handling, storage, transportation, and processing, incident to the final assembly of the finished lens into an end use product, such as an ophthalmic instrument, telescope, microscope, and the like.

In certain applications, it may be desirable for the protective film 4 formed for the aqueous coating compositions of this invention to be maintained on the substrate surface for added protection against scratching and the like in subsequent use of the product of which the substrate is part.

Figure 2:
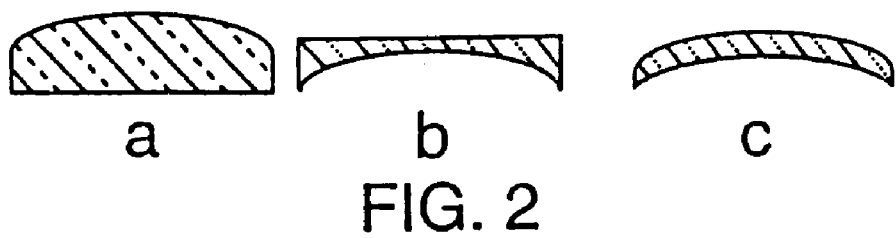
FIG. 2 represents a spray dispenser containing an aqueous-based coating composition in accordance with this invention.

FIG. 2 shows a schematic representation of a dispensing assembly 200 for application of an aqueous-based coating composition according to the present invention in sprayable form onto a surface of a substrate article.

Briefly, the dispensing assembly includes a vessel capable of containing a quantity of an aqueous-based coating composition, and a dispensing means operatively coupled with the vessel for dispensing the composition from the vessel. As shown, the dispensing assembly 200 includes a spray container 202 tightly sealed by top closure portion 204 having an aerosol spray head 206 at its upper end, disposed to generate a spray 210 of the aqueous coating formulation from nozzle 208 of the spray head 206. The aqueous-based coating composition spray 210 is shown as being directed onto a surface 212 of lens blank article 214, which is retained by retention elements 216 of a holder 218 having handle 220.

The aqueous-based coating composition of the present invention may be packaged in any suitable vessel, container or applicator assembly. The spray dispenser shown in FIG. 2 is a desirable type of dispensing device for the composition, which is utilized to form a uniform coating on the surface of the substrate article. In addition to aerosol containers, manual pump sprayers or similar apparatus could be employed, to the same effect.

The aqueous-based coating compositions of the present invention, when exposed to appropriate amounts and intensities of radiation in the electromagnetic spectrum and cured to a reaction product, are dry, tack-free surface films, and provide performance characteristics at least as desirable as those observed from prior organic solvent-based coatings, such as those described in the '488 patent. More specifically, protective coatings prepared from the aqueous coating composition in accordance with the present invention show no discernible distortion measurable in precision substrates such as glass lenses. Further, due at least in part to the presence of the urethane oligomer component in the aqueous coating composition of the invention, the resulting film possesses a strength, toughness and structural integrity which is not seen from such known protective coatings. And the protective coating films prepared in accordance with the present invention exhibit superior optical characteristics when contrasted to protective coatings formed from such known compositions.

Certain features and advantages of the present invention are more fully described with reference to the following examples, which are provided only for illustrative purposes and are in no way to be viewed as limiting the invention as taught and described herein.

EXAMPLES

Example 1

An aqueous-based coating composition in accordance with the present invention, may be formed from the formulation set forth in Table 1 below:

TABLE 1

| Component | Amount (% by wt.) |
| --- | --- |
| "NEORAD" NR-3709, organic prepolymer and reactive diluent | 49.52 |
| Lecithin, release agent | 0.5 |
| Triphenyl phosphine oxide, photoinitiator | 0.4 |
| Water | 46.71 |
| Dibutyl phthalate, plasticizer | 1.35 |
| DSX-1550, thickener | 0.84 |
| BYK-346 (polyether-modified PDMS), leveling agent | 0.13 |
| BYK-022 and 024, antifoam agents | 0.4 |
| FD+C Blue#1, dye | 0.15 |

This composition was applied to a prepared optical lens and tested for stain resistance which shows the propensity of optical coating compositions to stain various optical glass sustrates, using a Murmanski phase contrast microscope at 10x power, results of which are set forth in Table 2 below. The glass types noted may be readily obtained commercially from Ohara Components, Somerville, New Jersey or Schott Glass, Duryea, Pa.

TABLE 2

| Glass Type | Stain |
|---|---|
| SK16 | None |
| F2 | None |
| SSKN5 | Yes |
| SFL06 | None |
| LAF3 | None |
| BK7 | None |
| SF11 | None |
| ZKN7 | None |
| KZSF4 | None |
| F4 | None |
| SK10 | None |
| KZSF5 | None |
| SF57 | Yes |
| BASF52 | Yes |

Example 2

A series of aqueous-based composition were prepared to evaluate which component(s) thereof affect strippability of the dried and cured films. The compositions, their components and amounts thereof are presented below in Table 3.

TABLE 3

| Sample No. | 1 | 2 | 3 | 4 | 5 | 6 | 7 | 8 |
|---|---|---|---|---|---|---|---|---|
| Component | Amount - By Weight Percent | | | | | | | |
| "NEORAD" NR-3709 | 58.86 | 55 | 57.43 | 53.57 | 56.29 | 53.93 | 54.26 | 50.61 |
| Lecithin | — | — | 0.5 | 0.5 | 0.5 | 0.5 | — | — |
| Triphenyl phosphine oxide | 0.4 | 0.4 | 0.4 | 0.4 | 0.4 | 0.4 | 0.4 | 0.4 |
| Water | 40.74 | 43.25 | 41.67 | 44.18 | 42.41 | 44.65 | 44.815 | 47.12 |
| BYK-022/024 | — | — | — | — | 0.4 | 0.4 | 0.4 | 0.4 |
| Dibutyl phthalate | — | 1.35 | — | 1.35 | — | — | — | 1.35 |
| BYK-346 | — | — | — | — | — | 0.125 | 0.125 | 0.125 |

In Table 3, "NEORAD" NR-3709 represents the (meth)acrylate-capped organic prepolymer and reactive diluent components; lecithin represents the non-reactive, hydrophilic release agent component; triphenylphoshine oxide represents the photoinitiator component; BYK-022 and 024 represent antifoam agents; and BYK-346 represents a leveling agent.

Dibutyl phthalate is added as a plasticizer in Sample Nos. 2, 4 and 8.

The samples were prepared by mixing noted components together with a propellar and air mixer at room temperature for a period of time of 30 minutes.

The solids content of each sample was adjusted relative to that of the "NEORAD" NR-3709, which itself is an aqueous emulsion containing about 37% solids, so that the samples contained about 21% by weight solids.

The samples were applied, in duplicate, to a surface of each of a float glass substrate, an aluminum substrate and a cold-rolled steel substrate. The composition-coated substrates were then allowed to dry at room temperature for a period of time of greater than 24 hours, after which time the water component of the composition was evaporated. Half of the dried composition-coated substrates were then placed into a "ZETA" 7400 UV curing chamber for exposure to UV radiation at an intensity of 30 mW/cm$^2$ measured at 365 nm for a period of time of about 90 seconds.

To determine whether the dried and/or cured films were strippable the protocol of ASTM D-339-83-Method A was employed. That is, a sharp cutting device is used with a hard metal straight edge cutting guide to make an X-cut in the film. A semi-transparent pressure-sensitive tape with an adhesion strength of 40±2.5 oz./in. (according to ASTM D-3330) was applied thereover, and then removed. Adhesion of the film to the substrate was thus evaluated.

Following this procedure, the dried and cured films prepared from Sample Nos. 1–2 and 7–8 as described above were not strippable from the glass, aluminum or steel substrates. The dried and cured films prepared from Sample Nos. 3–6 were, however, strippable from each of the substrates. As noted in Table 3 above, Sample Nos. 1–2 and 7–8 did not contain a release agent, whereas Sample Nos. 3–6 did contain a release agent in an amount of 0.5% by weight.

A solvent deadhesion method was also used to remove from glass substrates the dried and cured films prepared from Sample Nos. 1–8 as described above. This method involves soaking the film-coated substrates in an aqueous bath containing about 2% sodium lauryl sulfate at a temperature of about 83° C.

The films formed from each of the samples, except nos. 1–2 and 7–8, released from the substrate within a period of time of less than about 15 minutes under those conditions. Also, the films made from Sample Nos. 3–6 released from the substrate substantially in one piece.

The protective coating composition of the present invention may be employed together with bulk adhesives in the manufacture of lenses, i.e., with adhesive compositions, such as those disclosed in the '387 patent, being employed to mount the lens on a support member or block for subsequent machining, polishing and/or other necessary treatments, and with the protective coating composition of the present invention being used, for example, to coat the lens with a protective coating on a finished first side of a lens during second side grinding, polishing and centering operations.

Although described herein with respect to the manufacture of lenses and optical precision products, the invention is not so limited, and the aqueous coating compositions hereof may be used to form a protective film on a wide variety of substrate articles, whose surface is susceptible to degradation, decomposition or other adverse effect in an unprotected stated. Examples of such substrate articles include those formed of materials such as metals, glasses, ceramics, resins, and the like. The inventive protective coating compositions described herein may also be employed as a sizing compositions for webs or fabrics formed of a wide variety of synthetic and/or non-synthetic materials, whether of a woven or non-woven character. The invention thus broadly extends to formation of a thin protective coating which is readily strippable from any of the surfaces on which it is formed.

While the invention has been described in detail and exemplified as set forth above, it will be readily understood that variations and modifications thereof may be achieved without departing from the spirit of this invention, the scope of which is defined by the claims.

What is claimed is:

1. An aqueous-based composition for forming a temporary protective coating on a substrate surface, said composition comprising:
   (a) a (meth)acrylate-capped organic prepolymer resin having at least one pendent hydrophilic group, said resin present in said composition in an amount in the range of about 5% up to less than 98% by weight of the total composition, (b) a reactive diluent having at least one polymerizable (meth)acrylate group, said reactive diluent present in said composition in the amount in the range of about 0.5% up to less than 10% by weight of the total composition, (c) a non-reactive, hydrophilic release agent, (d) a photoinitiator, and (e) water in an amount in the range of from about 40% to about 95% by weight, based on the weight of said composition.

2. The composition according to claim 1, wherein said (meth)acrylate-capped organic prepolymer resin of (a) is present in an amount within the range of about 5% up to less than 45% by weight of the total composition.

wherein n is from 1 to about 6 and m is from 1 to about 40.

6. The composition according to claim 4, wherein said polyalkylene moiety has at least one amino group ma y be represented by the structure below:

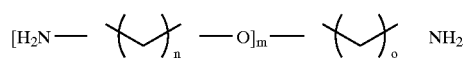

wherein n is from 1 to about 6 and m is from 1 to about 40, and o is from 1 to about 40.

7. The composition according to claim 1, wherein said (meth)acrylate-capped organic prepolymer resin of (a) is represented by the structure below:

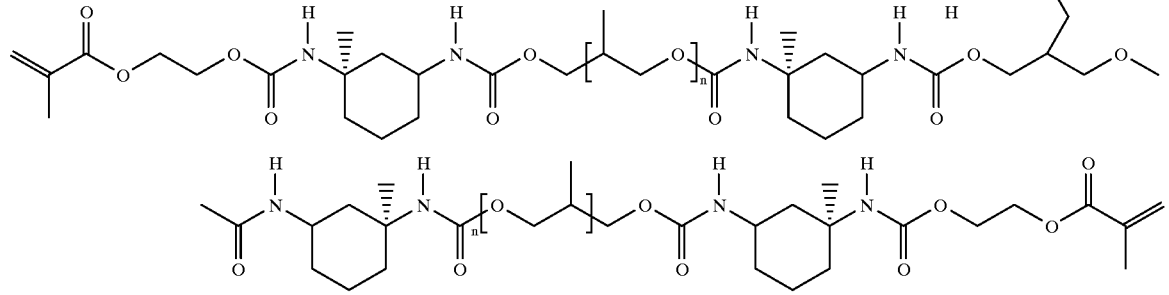

3. The composition according to claim 1, wherein said reactive diluent of (b) is present in an amount within the range of about 0.5% up to less than 5% by weight of the total composition.

4. The composition according to claim 1, wherein said (meth)acrylate-capped organic prepolymer resin of a) is a resin within the structure below:

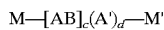

wherein A and A' may be the same or different and may be chosen from polyalkylene moieties having at least one hydroxyl group or amino group and having 1 to about 240 carbon atoms;

B is represented by C(W)(X)(Y)(Z), wherein X is an organic acid or an organic base; W is hydrogen or within X, but not necessarily the same as X; Y and Z may be the same or different and may be selected from hydroxyl- or amino-functionalized alkyl, alkenyl (linear, branched or cyclic) or aryl groups having from 2 to about 10 carbon atoms;

M and M' may be the same or different and are each selected from the group consisting of acrylates and methacrylates;

c is an integer between 1 and 5; and d is an integer between 1 and 10.

5. The composition according to claim 4, wherein said polyalkylene moiety has at least one hydroxyl group may be represented by the structure below:

wherein n is from 1 to about 6.

8. The composition according to claim 1, wherein said reactive diluent of (b) is a member selected from the group consisting of 1,3-butylene glycol diacrylate, diethylene glycol diacrylate, 1,6-hexandiol diacrylate, neopentyl glycol diacrylate, triethylene glycol diacrylate, tetraethylene glycol diacrylate, trimethylol propane ethoxylate triacrylate, pentaerythritol tetraacrylate, tripropylene glycol diacrylate, trimethylol propane triacrylate, ditrimethylol propane tetraacrylate, dipentaerythritol pentaacrylate, pentaerythritol triacrylate and corresponding (meth)acrylate compounds, and combinations thereof.

9. The composition according to claim 1, wherein said reactive diluent is selected from the group consisting of trimethylol propane triacrylate and dipentaerythritol pentaacrylate.

10. The composition according to claim 1, wherein said release agent is selected from the group consisting of fatty acid esters, fatty acid amides, fatty acid esters, fatty acid salts or metallic soaps, paraffin waxes, boeson, glycerol, and derivatives thereof, and combinations thereof.

11. The composition according to claim 1, wherein said release agent is lecithin.

12. The composition according to claim 1, wherein said photoinitiator is a member selected from the group consisting of acetophenone and derivatives thereof, benzophenone and derivatives thereof, benzil, benzoin and derivatives thereof, benzildimethylketal, benzoylbenzoate, alphaacyloxime esters, thioxanthone and derivatives thereof, azo-compounds, benzoyl peroxide, camphorquinone, phosphine oxides, [1-hydroxycyclohexyl phenyl ketone,2-methyl-1-[4-(methylthio)phenyl]-2-morpholino propan-1-one, 2-benzyl-2-N,N-dimethylamino-1-(4-morpholinophenyl)-1-butanone, 1-hydroxy cyclohexyl phenyl ketone, azobisisobutyronitrile, 2-hydroxy-2-methyl-1-phenyl-propan-1-one, 2-hydroxy-2-methyl-1-phenyl-1-propane, 1-benzoyl-cyclohexanol, and 2-hydroxy 2-methyl-1-phenyl-propan-1-one and dl-camphorquinone] and combinations thereof.

13. The composition according to claim 1, wherein said photoinitiator is a member selected from the group consisting of dichloroacetophenone, trichloroacetophenone, dialkoxyacetophenone, 2,2-dimethoxy-2-phenylacetophenone and 4-dialkylaminoacetophenone.

14. The composition according to claim 1, wherein said photoinitiator is a member selected from the group consisting of 4,4'-bis(dimethylamino)benzophenone, benzoin alkyl ether, 2-chlorothioxanthone, diethylthioxanthone, diphenyl-2,4,6-trimethylbenzoylphosphine oxide, bis(2,6-dimethoxybenzoyl-2,4-,4-trimethyl pentyl phosphine oxide, and 2,4,6-trimethylbenzoyldiphenyl-phosphine oxide.

15. The composition according to claim 1, wherein said photoinitiator is a member selected from the group consisting of 1-hydroxycyclohexyl phenyl ketone, 2-methyl-1-[4-(methylthio)phenyl]-2-morpholino propan-1-one, 2-benzyl-2-N,N-dimethylamino-1-(4-morpholinophenyl)-1-butanone, 1-hydroxy cyclohexyl phenyl ketone, azobisisobutyronitrile, 2-hydroxy-2-methyl-1-phenyl-propan-1-one, 2-hydroxy-2-methyl-1-phenyl-1-propane, 1-benzoyl-cyclohexanol, 2-hydroxy-2-methyl-1-phenyl-propan-1-one, dl-camphorquinone, and combinations thereof.

16. The composition according to claim 1, further comprising a component selected from the group consisting of plasticizers, thickeners, dyes, leveling agents, antifoam agents, stabilizing agents, adjuvants, non-reactive diluents, fillers, dispersing agents and combinations thereof.

17. The composition according to claim 1, having a viscosity adapted for spray application.

18. The composition according to claim 1, in the form of a one-part formulation.

19. The composition according to claim 1, having been dried to a film.

20. A reaction product of the composition according to claim 19, after exposure to radiation in the electromagnetic radiation.

21. A protectively coated article having a dry film protective coating on a surface thereof, wherein the dry film protective coating is formed by drying an aqueous-based coating composition applied on a surface of the article, wherein the composition comprises a (meth)acrylate-capped organic prepolymer resin having at least one pendent hydrophilic group, a reactive diluent having at least one polymerizable (meth)acrylate group, a non-reactive, hydrophilic release agent, a photoinitiator, and water.

22. The article according to claim 21, wherein the dry film protective coating has been exposed to radiation in the electromagnetic spectrum curingly effective to produce cross-linking of the (meth)acrylate-capped organic prepolymer resin and the (meth)acrylate-group-containing reactive diluent.

23. A method of protecting a surface of an article, said method comprising the steps of;
    (a) applying to the surface of the article an aqueous-based coating composition comprising:
        (i) a (meth)acrylate-capped organic prepolymer resin having at least one pendent hydrophilic group,
        (ii) a reactive diluent having at least one (meth)acrylate group,
        (iii) a non-reactive, hydrophilic release agent,
        (iv) a photoinitiator, and
        (v) water; and
    (b) drying the applied aqueous-based coating composition so as to form a dry, protective coating on such surface in the form of a film.

24. The method according to claim 23, wherein the drying step (b) is conducted at a temperature not exceeding 45° C.

25. The method according to claim 23, further comprising the step of:
    (d) stripping the film from the article surface.

26. The method according to claim 23, wherein the stripping step (d) includes a step selected from the group consisting of differential de-adhesion solvent de-adhesion and combinations thereof.

27. The method according to claim 23, further comprising the step of:
    (c) exposing the dry film on such surface to radiation in the electromagnetic spectrum curingly effective to cure the composition.

28. The method according to claim 27, wherein the radiation of step (c) includes radiation selected from the group consisting of visible radiation, ultraviolet radiation, and combinations thereof.

29. The method according to claim 27, further comprising the step of:
    (d) stripping the film from the article surface.

30. The method according to claim 27, wherein the stripping step (d) includes a step selected from the group consisting of differential de-adhesion solvent de-adhesion and combinations thereof.

* * * * *